United States Patent
Anger et al.

[11] Patent Number: 5,865,275
[45] Date of Patent: Feb. 2, 1999

[54] REAR KNUCKLE WITH BRAKE FEATURES

[75] Inventors: Stefan Ulrich Anger, Oxford; Bernhard Walter Kullmann, Rochester Hills, both of Mich.

[73] Assignee: ITT Manufacturing Enterprises, Inc., Wilmington, Del.

[21] Appl. No.: 846,448

[22] Filed: May 1, 1997

[51] Int. Cl.[6] .................................................. F16D 63/00
[52] U.S. Cl. ..................... 188/18 A; 164/98; 188/70 R; 188/205 R; 188/73.39; 188/73.43
[58] Field of Search .................... 188/18 A, 70 R, 188/70 B, 106 A, 106 P, 106 F, 205 R, 206 R, 361–369, 73.43, 73.39, 340, 341, 78, 71.1, 18 R, 17, 325; 164/98, 112, 334, 99; 29/401.1, DIG. 26, 98, 112, 334, 99

[56] References Cited

U.S. PATENT DOCUMENTS

| | | | |
|---|---|---|---|
| 3,122,221 | 2/1964 | Von Rucker | 188/70 R |
| 3,850,266 | 11/1974 | Hesskamp et al. | 188/70 R |
| 4,995,481 | 2/1991 | Temple et al. | 188/18 R |
| 5,322,145 | 6/1994 | Evans | 188/205 R |
| 5,590,742 | 1/1997 | Gutelius | 188/205 R |
| 5,620,042 | 4/1997 | Ihm | 164/98 |

*Primary Examiner*—Douglas C. Butler
*Attorney, Agent, or Firm*—Thomas N. Twomey; J. Gordon Lewis

[57] ABSTRACT

A vehicular brake assembly comprises brake shoes and a brake disc. The brake shoes are fastened to a sheet plate and mounted inside an inner drum portion of the brake disc. The brake disc is operatively connected to an axle placed within a stationary axle housing that carries a mounting flange. The sheet plate is fastened to the mounting flange. An anchor pin is attached to the mounting flange and an opening is made in the sheet plate for the anchor pin to project therethrough to thereby serve as an abutment surface for the brake shoes transferring any force exerted on the brake shoes directly to the mounting flange. The brake disc is operatively engaged with a caliper adapted to grip an outward portion of the brake disc. The caliper slides are provided on the mounting flange to receive the caliper. A method of making a flange for the braking structure comprises the steps of having a flange intended to match an axle housing and preferably made as a pre-stamped metal sheet part, the flange being provided with mounting holes; placing the prefabricated flange into a form (mold); and casting an anchor pin and caliper slides onto respective surfaces of the flange.

9 Claims, 3 Drawing Sheets

FIG 1
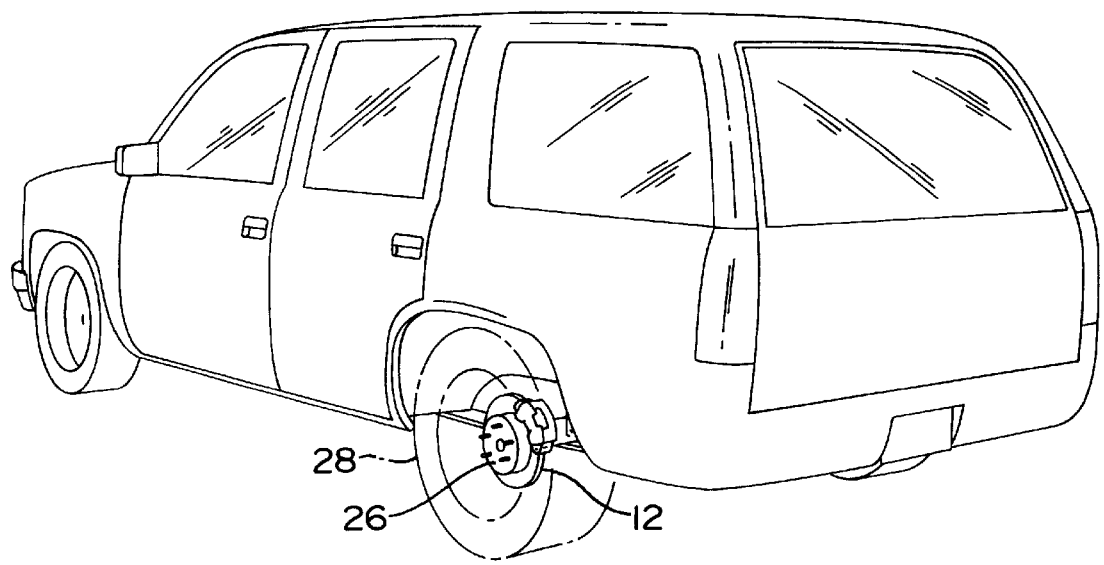
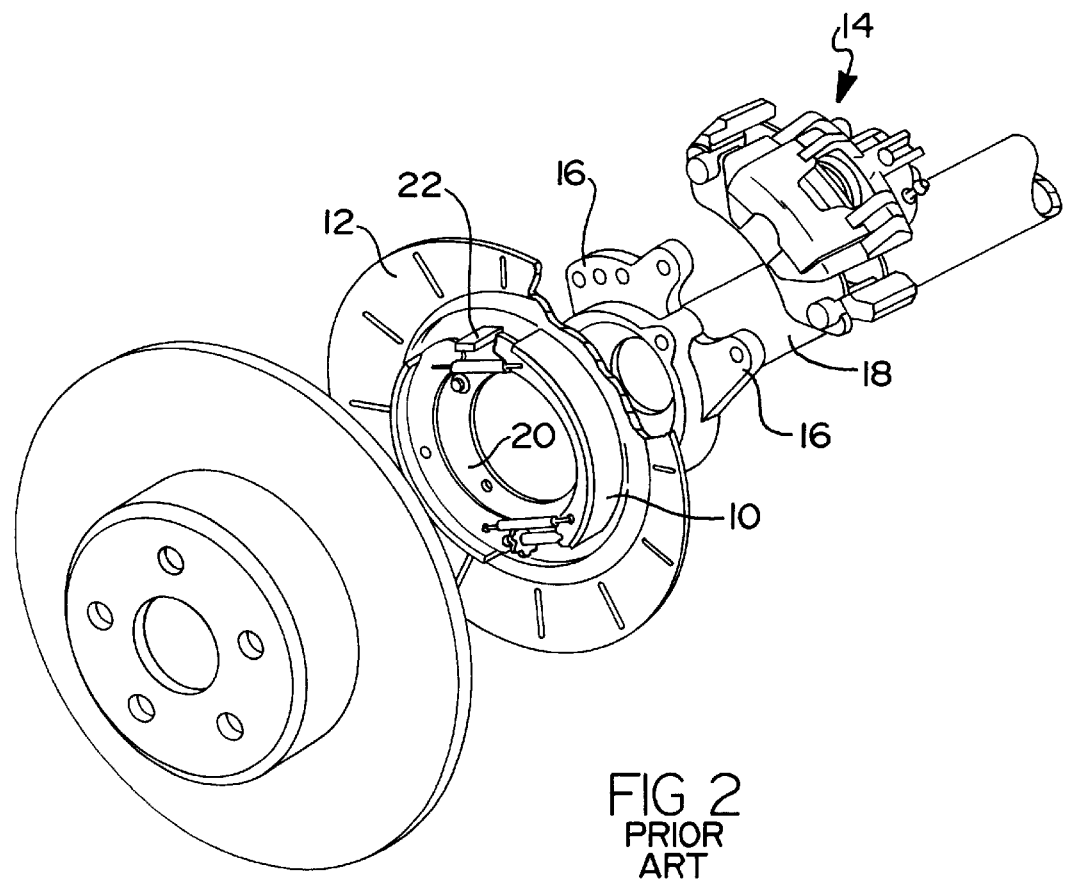
FIG 2
PRIOR ART

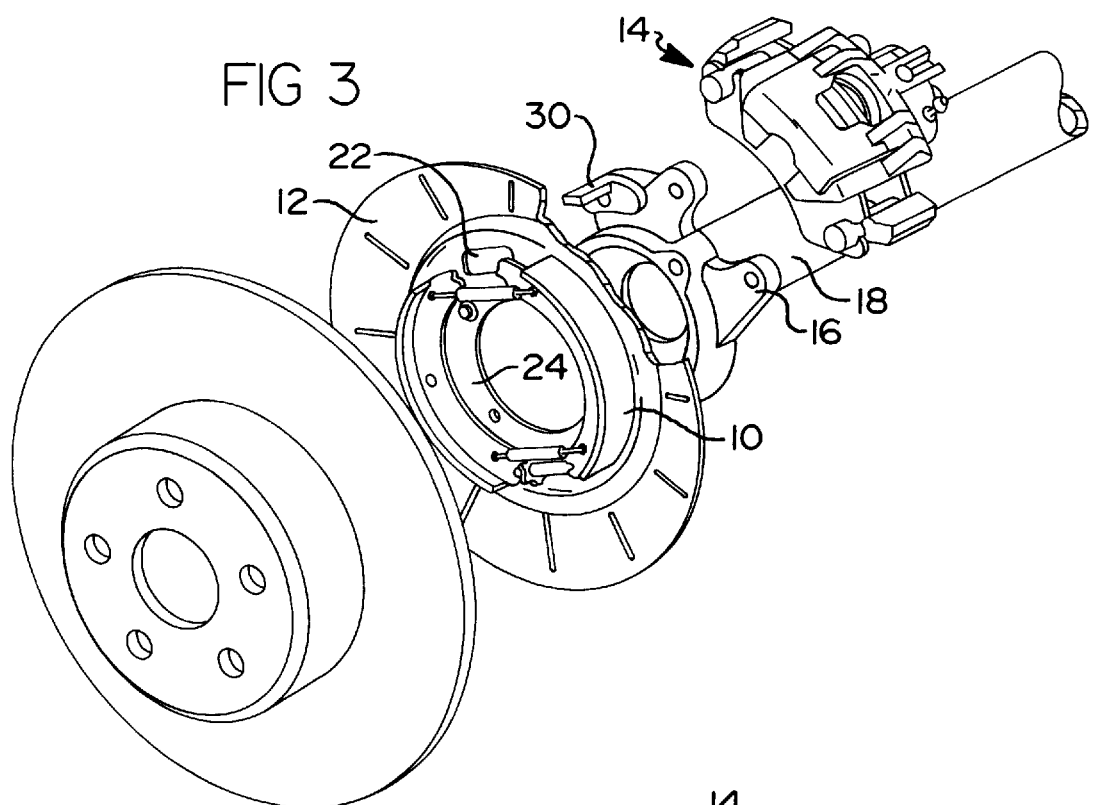
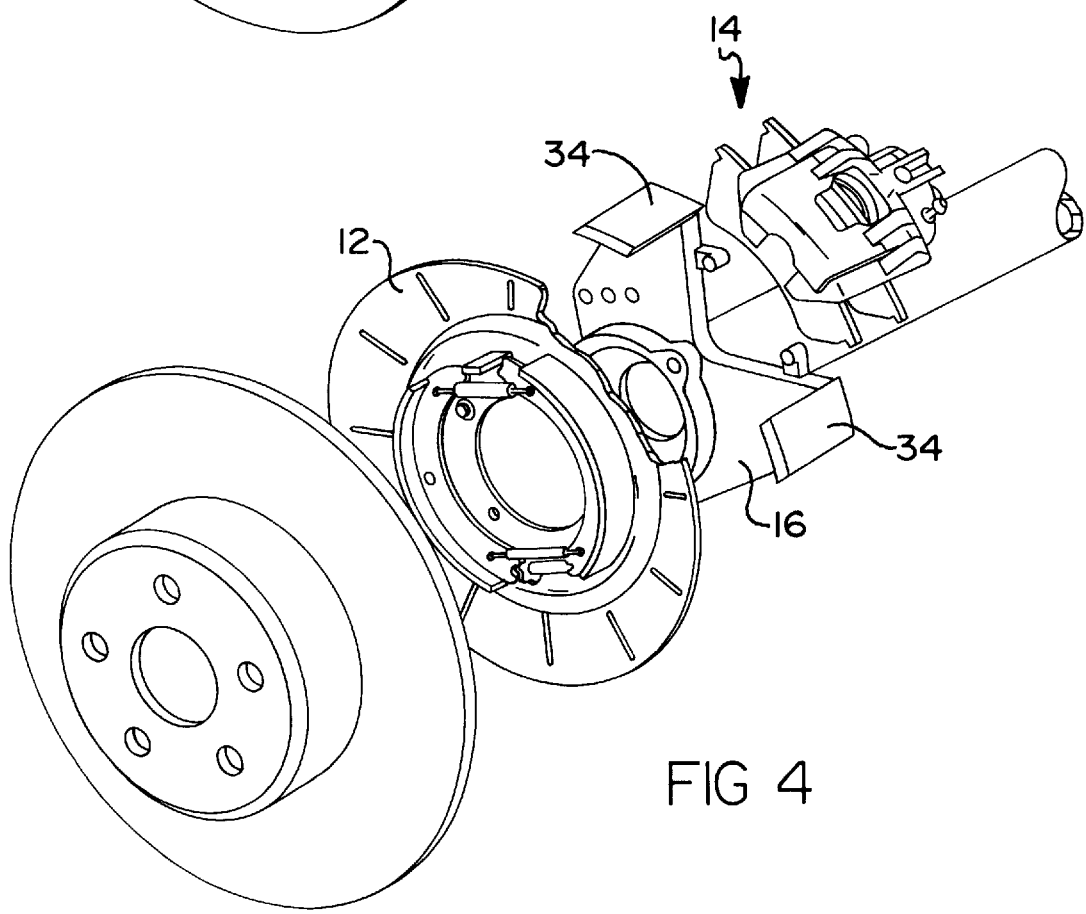

REAR KNUCKLE WITH BRAKE FEATURES

BACKGROUND OF THE INVENTION

1. Field of the Invention

The present invention relates to a vehicular brake apparatus. More particularly, the invention deals with a knuckle for a brake assembly for rear drive vehicles. Still more specifically, the present invention offers a novel rear knuckle structure with brake features.

2. Description of Related Art

The brakes are one of the most important parts of an automobile as far as its safe operation is concerned. Depicted in FIG. 1 is a view of a car with its rear left wheel taken off to show the area touched upon by the present invention, whereas FIG. 2 illustrates two types of brakes currently employed on cars: disc brakes and drum brakes. A conventional drum brake circuit comprises a hydraulic system, brake shoes, and a brake drum. The hydraulic system is actuated by a driver pressing upon a brake pedal. The driver's action forces the hydraulic fluid out of the master cylinder and into each wheel brake cylinder. The fluid entering the wheel cylinders forces the opposed pistons farther apart, thus moving the brake shoes outward against the brake drum.

A typical prior art structure of caliper disc brakes assumes the presence of a revolving wheel disc operatively connected to a drive axle. An axle housing encloses the drive axle. Secured to the drive axle housing is a brake caliper whose function is to transmit braking forces from brake pads to the housing. The caliper is comprised of a casting accommodating at least one brake cylinder in which a piston adapted for a reciprocal movement is mounted. The cylinder and piston cooperate to define a pressure chamber which is pressurized by hydraulic fluid when the brake is actuated. A brake pad (or lining) assembly is mounted on the caliper and is moved toward the revolving wheel disc when the piston is moved outwardly in the cylinder due to brake pressure in the chamber. In so doing, the piston and brake lining cooperatively exert a friction force on the disc.

It is not uncommon in vehicles having rear disc brakes to incorporate brake shoes 10 (FIG. 2) within an inner drum portion (not shown) of a wheel disc 12 to accomplish a parking brake function while a caliper 14 is used to grip a radial outward portion of the wheel disc 12 to perform normal braking. In conventional prior art designs of that kind usually referred to as disc & DiH (for Drum in Hat) brakes, a flange 16 is provided on (usually bolted to) an axle housing 18, carrying a caliper slide subassembly (not shown) for mounting the caliper 14 thereto. Also, the brake shoes 10 are typically fastened to a sheet metal face plate 20 serving as a backing plate which is also bolted to the flange 16. A pin 22 is attached to the plate 20. It serves as an abutment surface for the brake shoes 10 transferring any force exerted on the brake shoes directly to the plate 20. To transfer braking forces further to the flange 16, a substantially solid face plate 20 is required. It is desired to eliminate the caliper slide subassembly and to have the plate thinner and thus less expensive.

SUMMARY OF THE INVENTION

Therefore, an object of the present invention is to provide a vehicular brake assembly which, holding the assets of prior art structures, would not be subject to their drawbacks.

Another object of the present invention is to make a vehicular brake assembly less complex and less expensive.

According to one aspect of the present invention, there is provided a vehicular brake assembly comprising brake shoes and a brake disc. The brake shoes are fastened to a sheet plate and mounted inside an inner drum portion of the brake disc. The brake disc is operatively connected to an axle placed within a stationary axle housing that carries a mounting flange. The sheet plate is fastened to the mounting flange. An anchor pin is attached to the mounting flange and an opening is made in the sheet plate for the anchor pin to project therethrough to thereby serve as an abutment surface for the brake shoes transferring any force exerted on the brake shoes directly to the mounting flange.

According to the other aspect of the invention, the brake disc is operatively engaged with a caliper adapted to grip an outward portion of the brake disc. The caliper slides are provided on the mounting flange to receive the caliper.

A method of making a flange for a disc & DiH braking structure comprises the steps of having a flange intended to match an axle housing and preferably made as a pre-stamped metal sheet part, the flange being provided with mounting holes; placing the prefabricated flange into a form (mold); and casting an anchor pin and/or caliper slides onto respective surfaces of the flange.

BRIEF DESCRIPTION OF DRAWINGS

Other objects, features and advantages of the present invention will become apparent from the ensuing description of the preferred embodiments considered in conjunction with the accompanying drawings in which FIG. 1 is a view of a car with its rear left wheel taken off to show the area touched upon by the present invention, and FIGS. 2, 3, 4 and 5 present exploded views of brake assemblies, FIG. 2 illustrating disc and drum brakes currently employed on cars;

FIG. 3 showing a brake assembly according to one aspect of the present invention;

FIG. 4 depicting a brake assembly according to another aspect of the present invention; and FIG. 5 being a view of the brake assembly according to both aspects of the present invention.

PREFERRED EMBODIMENTS OF THE INVENTION

Figure 5:
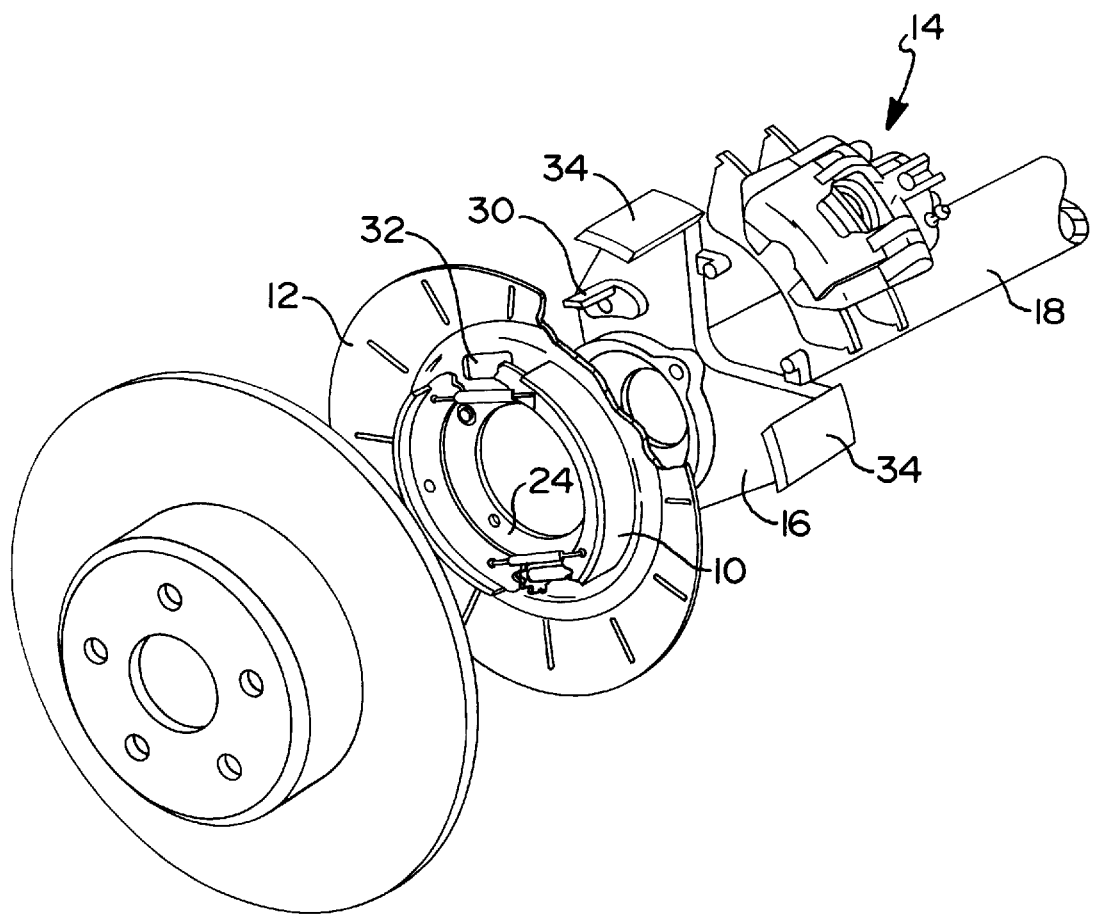

A brake assembly in accordance with one aspect of the present invention is shown in FIG. 3. It represents a rear disc brake system which incorporates shoe brakes for parking purposes and a hydraulic caliper for dynamic braking purposes. The assembly comprises brake shoes 10 which are mounted inside an inner drum portion (not shown) of a revolving brake disc 12. The brake shoes 10 are fastened to a sheet plate 24. A drive axle (not shown) is operatively connected to the revolving disc 12 which in turn is connected to wheel lugs 26 (FIG. 1). As the drive axle rotates, wheel lugs 26 which are connected to a vehicle wheel 28 (shown by a dash-dot line in FIG. 1) by means of a wheel hub (not shown) rotate the wheel 28. An axle housing 18 encloses the drive axle which can be suitably mounted therein by means of axle bearing (not shown). Fixed on the axle housing 18 is a mounting flange 16. The sheet plate 24 is fastened to the mounting flange 16. An anchor pin 30 is attached to the mounting flange 16 and an opening 32 is made in the sheet backing plate 24 for the anchor pin 30 to project therethrough and serve as an abutment surface for the brake shoes 10 transferring any force exerted on the brake shoes directly to the mounting flange 16.

The anchor pin 30 can be integrally formed into the flange 16 by means of casting it onto a side portion of the flange 16. The casting is typically achieved by creating a casting form, or a mold, normally of sand (the form is not shown), which accepts the finished stamped sheet metal flange 16 therein. The flange is provided with all necessary mounting holes. The exact location of the flange 16 in the casting form is ensured by stamped location holes. After the molded cast iron has been poured into the molding capping the area of the flange 16 intended to receive the pin 30, it cools and adheres to the flange 16. When the flange 16 is fashioned this way, there is no machining operation which must be done thereto in order to make the flange conform with the drive axle housing 18. Since it is the sheet metal flange 16 that provides the conformity, it may be accurately stamped, whereby no additional machining operations are necessary thereafter. The method as described is suitable for permanent molding or for a sand casting process. The inherit problems of the sand casting process such as mold shift, core positioning, etc., can be compensated by secondary machining to create a finished flange.

By fashioning anchor pin 30 directly to flange 16, the backing plate 24 can be made much thinner and less expensive than in traditional designs which use the structural integrity of the backing plate 22 (FIG. 2) to transfer braking forces from the shoes 10 to the flange 16.

Referring now to FIG. 4 where the second aspect of the present invention is illustrated, the brake disc 12 is operatively engaged with a caliper 14 adapted to seize and hold an outward portion of the brake disc 12. The caliper 14 is attached to the mounting flange 16, and, according to the present invention, caliper slides 34 are made on the mounting flange 16 to receive the caliper 14. The caliper slides 34 of the present invention can be similarly formed into the flange 16 to become its casting part. To perform that, a pre-stamped flange 16 provided with mounting holes is placed into a form (mold) and the slides 34 are cast onto an upper and side edges of the flange 16. Because of the precise nature in which flange 16 can be machined and/or otherwise formed prior to casting the slides 34 thereon, it provides exact surface tolerances, and little or no machining operations are necessary.

By providing the mounting flange 16 with the caliper slides 34, the need for a traditional caliper slide subassembly between the caliper 14 and the flange 16 is eliminated.

FIG. 5 illustrates the brake structure realizing the both above-described aspects of the present invention separately shown in FIGS. 3 and 4.

In view of the above disclosure, a method of making a flange for a disc & DiH braking structure may be resumed as a combination of steps of having a flange intended to match an axle housing and preferably made as a pre-stamped metal sheet part, the flange being provided with mounting holes; placing the prefabricated flange into a form (mold); and casting an anchor pin and/or caliper slides onto respective surfaces of the flange. Additional structural elements that may be taken to, for example, properly connect the flange to the axle housing and to match therewith, are placed into the form prior to casting, secured in predetermined positions therein, and, partially submerged into the casting, become an integral part thereof after cooling the casting.

Employing the technique of the present invention presents a possibility of the direct replacement of an existing rear drum brake system by a disc assembly having a DiH center portion for accommodating a parking brake without the need to modify such vehicle features as track, axle, etc., inasmuch as the sheet metal parts of identical thickness can be used for the flange.

While specific forms and a process have been described in the foregoing specification and illustrated in the accompanying drawings to show the preferred embodiments of the present invention, it will be appreciated that the invention is not limited to the exact construction shown and the process described. On the contrary, various alterations, modifications, configurations, changes, and subassemblies falling within the scope and spirit of the invention and apparent to those skilled in the art can be made.

The embodiments of the present invention in which an exclusive property or privilege is claimed are limited by the appended claims only.

What is claimed is:

1. A disc and drum brake assembly for a vehicle, comprising:

brake shoes;

a brake disc;

said brake disc having an inner drum portion to accommodate said brake shoes;

said brake shoes being fastened to a sheet plate;

said sheet plate being fastened to a mounting flange;

said brake disc being operatively connected to an axle placed within a stationary axle housing and connected to wheel lugs supporting a wheel;

said mounting flange carried by said axle housing;

a caliper adapted to grip an outward portion of said brake disc;

means for attaching said caliper to said mounting flange; and an anchor pin attached to said mounting flange;

said sheet plate being provided with a hole therein;

said hole matching said anchor pin in such a way that said anchor pin protudes through said hole, to thereby serve as an abutment surface for said brake shoes and to transfer a force exerted on said brake shoes immediately to said mounting flange.

2. The disc and drum brake assembly for a vehicle as claimed in claim 1, wherein said anchor pin is made an integral part with said mounting flange.

3. The disc and drum brake assembly for a vehicle as claimed in claim 1, wherein said attachment of said caliper to said mounting flange is performed by means of caliper slides fastened to said mounting flange, said caliper slides receiving said caliper.

4. The disc and drum brake assembly for a vehicle as claimed in claim 3, wherein said caliper slides are made integral parts with said mounting flange.

5. A disc and drum brake assembly for a vehicle, comprising;

brake shoes;

a brake disc;

said brake disc having an inner drum portion to accommodate said brake shoes;

said brake shoes being fastened to a sheet plate;

said brake disc being operatively connected to an axle placed within a stationary axle housing and connected to wheel lugs supporting a wheel;

a mounting flange carried by said axle housing;

a caliper adapted to grip an outward portion of said brake disc;

said caliper being attached to said mounting flange;

said attachment of said caliper to said mounting flange being performed by means of caliper slides fastened to said mounting flange, said caliper slides receiving said caliper;

said sheet plate being fastened to said mounting flange; and means for transferring a force exerted on said brake shoes to said mounting flange, said means servicing as an abutment surface for said brake shoes, wherein said force transferring means includes an anchor pin attached to said mounting flange, said sheet plate is provided with a hole therein, and said hole matches said anchor pin whereby said anchor pin protrudes through said hole, to thereby transfer a force exerted on said brake shoes immediately to said mounting flange.

6. The disc and drum brake assembly for a vehicle as claimed in claim 5, wherein said caliper slides are made integral parts with said mounting flange.

7. The disc and drum brake assembly for a vehicle as claimed in claim 5, wherein said anchor pin is made an integral part with said mounting flange.

8. A method of making a flange for a disc and drum braking structure, said structure comprising brake shoes; a brake disc, said brake disc having an inner drum portion to accommodate said brake shoe, said brake shoes being fastened to a sheet plate; a mounting flange carried by an axle housing; a caliper adapted to grip an outward portion of said brake disc, said caliper being attached to said mounting flange by means of caliper slides fastened to said mounting flange, said caliper slides receiving said caliper; said sheet plate being provided with a hole therein and being fastened to said mounting flange; and an anchor pin attached to said mounting flange, said hole matching said anchor pin whereby said anchor pin protrudes through said hole to define an abutment surface for said brake shoes transferring a force exerted on said brake shoes immediately to said mounting flange; said method comprises the steps of:

having said mounting flange matching said axle housing and made as a pre-stamped metal sheet part, said flange being provided with mounting holes;

placing said prefabricated flange into a form (mold); and casting said anchor pin onto respective surface of said flange.

9. The method of making a flange for a disc and drum braking structure as claimed in claim 8, further comprising the step of casting said caliper slides onto respective surfaces of said flange.

\* \* \* \* \*